United States Patent
Sevel et al.

(10) Patent No.: US 10,730,502 B2
(45) Date of Patent: Aug. 4, 2020

(54) METHOD AND APPARATUS TO CONTROL VEHICLE OPERATION ON A GRADE

(71) Applicant: GM Global Technology Operations LLC, Detroit, MI (US)

(72) Inventors: Kris Sevel, Rochester Hills, MI (US); Mindy L. Barth, Farmington Hills, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 16/242,632

(22) Filed: Jan. 8, 2019

(65) Prior Publication Data

US 2020/0216056 A1 Jul. 9, 2020

(51) Int. Cl.
  *G06F 7/70* (2006.01)
  *B60W 10/184* (2012.01)
  *B60W 10/04* (2006.01)
  *B60W 30/18* (2012.01)

(52) U.S. Cl.
  CPC .......... *B60W 10/184* (2013.01); *B60W 10/04* (2013.01); *B60W 30/18063* (2013.01); *B60W 30/18109* (2013.01); *B60W 2520/10* (2013.01); *B60W 2540/10* (2013.01); *B60W 2540/12* (2013.01); *B60W 2552/15* (2020.02); *B60W 2710/0666* (2013.01); *B60W 2710/083* (2013.01); *B60W 2710/18* (2013.01)

(58) Field of Classification Search
  CPC .............. B60W 10/184; B60W 10/04; B60W 30/18063; B60W 30/18109; B60W 2552/15; B60W 2520/10; B60W 2540/10; B60W 2540/12; B60W 2710/083; B60W 2710/0666; B60W 2710/18; G06F 7/70
  USPC ............ 701/22, 35, 37, 70, 82, 90; 180/197, 180/65.265; 477/40; 303/191
  See application file for complete search history.

(56) References Cited

U.S. PATENT DOCUMENTS

| | | | |
|---|---|---|---|
| 2005/0017580 A1* | 1/2005 | Cikanek | B60W 10/18 303/191 |
| 2005/0211479 A1* | 9/2005 | Tamor | B60W 10/06 180/65.25 |
| 2007/0073466 A1* | 3/2007 | Tamai | B60W 10/06 701/70 |
| 2007/0191181 A1* | 8/2007 | Burns | B60W 10/26 477/40 |
| 2008/0195289 A1* | 8/2008 | Sokoll | B60T 7/122 701/70 |

(Continued)

Primary Examiner — Shardul D Patel
(74) Attorney, Agent, or Firm — Quinn IP Law

(57) ABSTRACT

A vehicle system including a propulsion system coupled to a drive wheel and a friction brake configured to apply braking torque to a vehicle wheel is described. Operation thereof includes an instruction set that is executable to monitor vehicle speed, vehicle grade, and an operator braking request, and execute instructions upon achieving a vehicle speed that is less than a threshold speed. The instructions include controlling, via the friction brake, the braking torque to achieve a desired vehicle speed, and determining an operator acceleration request and the vehicle grade. The controller determines a minimum vehicle grade-based operator acceleration request, and releases the friction brake only when the operator acceleration request is greater than the minimum vehicle grade-based operator acceleration request.

19 Claims, 3 Drawing Sheets

(56) References Cited

U.S. PATENT DOCUMENTS

| | | | |
|---|---|---|---|
| 2008/0224478 A1* | 9/2008 | Tamor | B60W 20/00 290/40 C |
| 2010/0250056 A1* | 9/2010 | Perkins | B60W 30/18172 701/33.4 |
| 2011/0213517 A1* | 9/2011 | Laws | B60W 10/26 701/22 |
| 2015/0183434 A1* | 7/2015 | Adamey | F02D 41/021 701/70 |
| 2016/0318501 A1* | 11/2016 | Oldridge | B60L 15/2045 |
| 2017/0232969 A1* | 8/2017 | Hunt | B60T 8/17 477/93 |

* cited by examiner

METHOD AND APPARATUS TO CONTROL VEHICLE OPERATION ON A GRADE

INTRODUCTION

Vehicle systems operating on a grade at light load and low speed for extended periods of time may experience component overheating. This may be more pronounced on vehicles that employ advanced propulsion systems that include electric motors, including those in which component cooling is achieved by cooling systems that are dependent on vehicle speed.

SUMMARY

A vehicle system including a propulsion system coupled to a drive wheel and a friction brake configured to apply braking torque to the drive wheel is described. The vehicle system includes an accelerator pedal configured to monitor an operator acceleration request, a brake pedal configured to monitor an operator braking request, a grade monitoring sensor configured to monitor vehicle grade, and a vehicle speed sensor. A controller is in communication with the accelerator pedal, the brake pedal, the grade monitoring sensor and the vehicle speed sensor, and is operatively connected to the friction brake and the propulsion system. The controller includes an instruction set that is executable to monitor the vehicle speed, the vehicle grade, and the operator braking request, and execute instructions upon achieving a vehicle speed that is less than a threshold speed. The instructions include controlling, via the friction brake, the braking torque to achieve a desired vehicle speed, and determining an operator acceleration request and the vehicle grade. The controller determines a minimum vehicle grade-based operator acceleration request, and releases the friction brake only when the operator acceleration request is greater than the minimum vehicle grade-based operator acceleration request.

An aspect of the disclosure includes the minimum vehicle grade-based operator acceleration request being determined based upon an ability of the propulsion system to reject heat under the present operating conditions.

Another aspect of the disclosure includes the instruction set being executable to control, via the friction brake, the vehicle speed to maintain the vehicle speed at a zero speed condition.

Another aspect of the disclosure includes the instruction set being executable to control, via the friction brake, the braking torque to achieve a vehicle speed that is greater than or equal to zero speed.

Another aspect of the disclosure includes the instruction set being executable to release the friction brake by ramping out the braking torque to achieve a zero braking torque over an elapsed time period.

Another aspect of the disclosure includes the instruction set being executable to control the propulsion system to transfer propulsion torque to the drive wheel coincident with the ramping out of the braking torque, wherein the propulsion torque is greater than the minimum vehicle grade-based operator acceleration request.

Another aspect of the disclosure includes the instruction set executable to release the friction brake comprises the instruction set being executable to release the braking torque to immediately achieve a zero braking torque.

Another aspect of the disclosure includes the instruction set being executable to control the propulsion system to transfer propulsion torque to the drive wheel coincident with the immediate release of the braking torque, wherein the propulsion torque is greater than the minimum vehicle grade-based operator acceleration request.

Another aspect of the disclosure includes the instruction set being executable to control the propulsion system responsive to the operator acceleration request.

Another aspect of the disclosure includes the instruction set being executable to determine the minimum vehicle grade-based operator acceleration request by selecting a precalibrated value for the minimum vehicle grade-based operator acceleration request based upon heat generation and heat rejection of the propulsion system.

Another aspect of the disclosure includes the minimum vehicle grade-based output torque request being determined based upon a thermal capability of the propulsion system to operate for an extended period of time at a creep speed to prevent overheating of a component of the propulsion system.

Another aspect of the disclosure includes a method for controlling a vehicle system including a propulsion system coupled to a drive wheel and a friction brake configured to apply a braking torque a driven wheel. The method includes monitoring vehicle speed and an operator braking request. Upon achieving a vehicle speed that is less than a threshold speed, the friction brake applies the braking torque to achieve a desired vehicle speed. An operator acceleration request is determined, as is vehicle grade via a grade monitoring sensor. A minimum vehicle grade-based operator acceleration request is determined, and the friction brake is released only when the operator acceleration request is greater than the minimum vehicle grade-based operator acceleration request.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
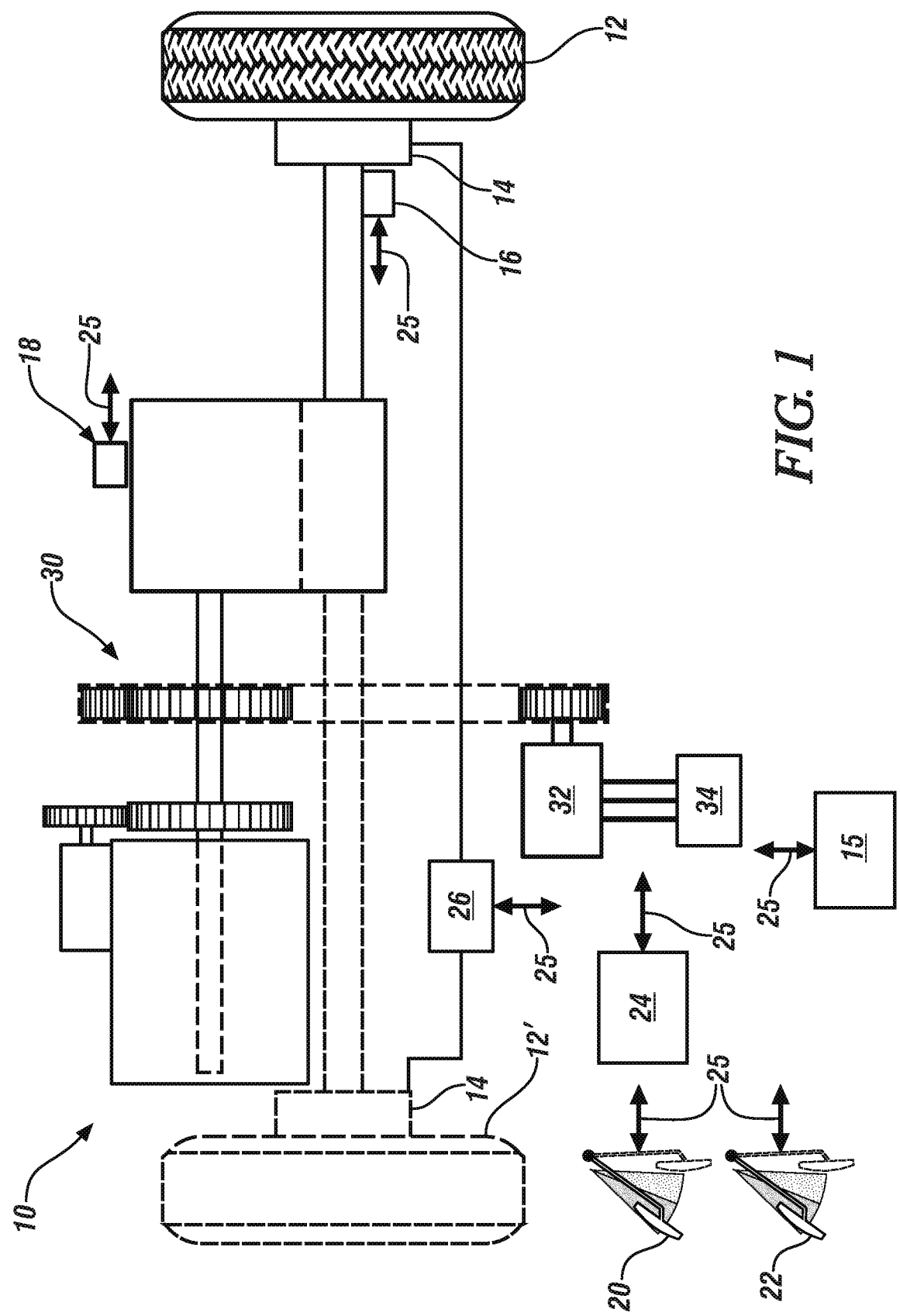
FIG. 1 schematically shows a vehicle system including a propulsion system and a drive wheel, in accordance with the disclosure.

Referring to the drawings, wherein like reference numerals correspond to like or similar components throughout the several Figures, FIG. 1, consistent with embodiments disclosed herein, illustrates a vehicle 10 that includes a propulsion system 30 coupled to one or a plurality of drive wheel(s) 12, with vehicle operation directed via a vehicle controller 15. The vehicle 10 may also include one or a plurality of driven wheel(s) 12', wherein each of the drive wheels 12 and each of the driven wheels 12' is equipped with a friction wheel brake 14. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The propulsion system 30 transforms stored energy into propulsion power, and may include by way of non-limiting examples, an internal combustion engine, an electric machine, a fuel/electric hybrid system, etc. The propulsion system 30 may include another form of torque machine, such as a pneumatically-powered device or a hydraulically-powered device.

The propulsion system 30 also includes a geartrain that transfers the propulsion power to the drive wheel 12. Operation of the propulsion system 30 may be controlled by a powertrain controller 24, with an operator command in the form of an operator acceleration request being provided via an accelerator pedal 20. The friction wheel brakes 14 are operably controlled by a braking controller 26 in response to an operator braking request that is provided via an operator-activated brake pedal 22. A wheel speed sensor 16 may be disposed on each of the drive wheels 12 and on each of the driven wheels 12' to monitor rotational speeds thereof, from which vehicle speed may be determined. Alternatively, another rotational speed sensor may be deployed that generates information that can be used to monitor vehicle speed. The vehicle 10 also includes a vehicle grade sensor 18, which is a device that dynamically monitors vehicle attitude, and may be a piezoelectric device or another device. The wheel speed sensor 16 and the vehicle grade sensor 18 are in communication with the vehicle controller 15. The accelerator pedal 20 may be in communication with the vehicle controller 15, and the brake pedal 22 may be in communication with the braking controller 26. Alternatively, or in addition, the aforementioned sensors and actuators may be in communication with the other controllers, either directly or via a communication bus. The vehicle 10 also includes an electrically-powered accessory device 32, such as an electric power steering pump or another on-vehicle device that consumes or generates electrical power, in the process of which it also generates heat. In one embodiment, the electrically-powered accessory device 32 is controlled by an inverter 34. The generated heat is rejected by convective heat transfer to air in the surrounding environment. The vehicle 10 may further include hardware that is not illustrated in FIG. 1 but is nonetheless contemplated herein.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a link 25, which may be in the form of a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
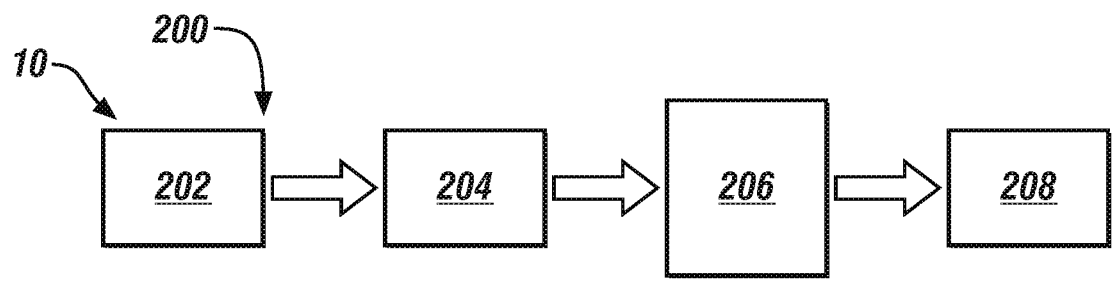
FIG. 2 schematically shows information flow associated with a control routine to control operation of the vehicle to modify a minimum propulsion torque, in accordance with the disclosure.

FIG. 2 schematically shows information flow associated with a control routine 200, which may be in the form of an algorithm that is executed in the vehicle controller 15 to control operation of an embodiment of the vehicle 10 that is described with reference to FIG. 1. As described herein, the control routine 200 is provided to modify a minimum propulsion torque that is available when the vehicle 10 is operating on an uphill grade in order to discourage low speed crawling and avoid propulsion-based hill hold torque. Instead, the friction brakes are applied when necessary in order to prevent vehicle rollback.

The control routine 200 includes monitoring operation of the vehicle 10, including monitoring vehicle speed, the operator acceleration request, and the operator braking request (202). When the vehicle speed is less than a threshold speed, e.g., at or near zero speed, the braking controller 26 controls the friction brakes 14 to apply braking torque to achieve a desired speed, e.g., zero speed (204). An operator acceleration request is monitored via the accelerator pedal 20, and vehicle grade is monitored via the grade monitoring sensor 18. When the vehicle operator requests vehicle acceleration, as indicated by an increase in the operator acceleration request, the friction brakes are commanded to remain engaged until the operator acceleration request is greater than a minimum vehicle grade-based operator acceleration request (206). In one embodiment, the torque command for controlling operation of the propulsion system 30 is replaced with a zero torque command or minimum thermally robust torque command when the position of the accelerator pedal is less than that associated with the minimum vehicle grade-based operator request.

The minimum vehicle grade-based operator acceleration request is determined based upon an ability of the propulsion system 30 or the electrically-powered accessory device 32 to reject heat, including but not limited to extended periods of low-speed creep operation. The friction brake 14 is released when the operator acceleration request is greater than the minimum vehicle grade-based operator acceleration request (208). Thus the vehicle grade is employed as an input to torque response determination in order to eliminate or quickly pass through the most severe propulsion system operating conditions, and thus avoid or minimize heat generation.

Figure 3:
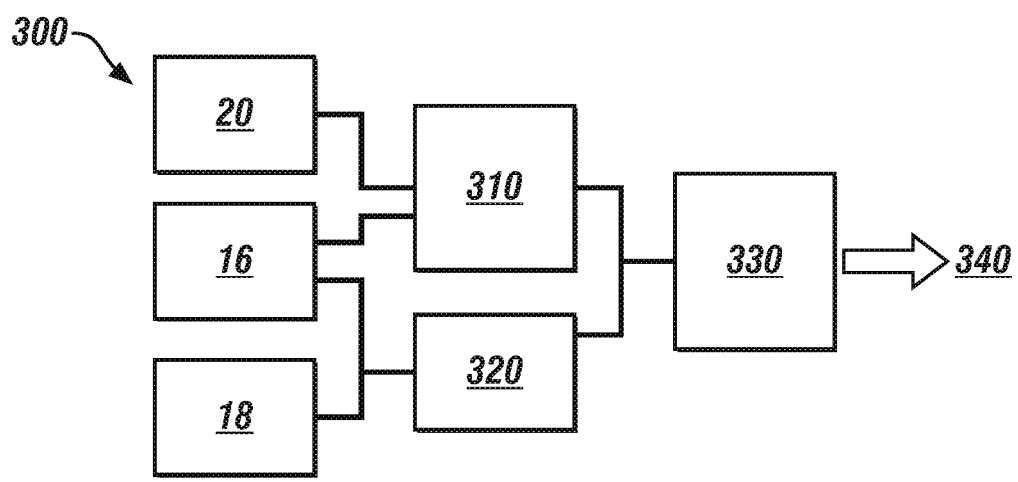
FIG. 3 schematically shows a process to determine an axle torque request that is based upon an operator acceleration request and accounts for vehicle grade, in accordance with the disclosure.

FIG. 3 schematically shows a process 300, executed as one or more control routines in one of the controllers, to determine an axle torque request 340 that is based upon an operator acceleration request and accounts for vehicle grade. The inputs include vehicle speed, from the wheel speed sensor 16, an operator acceleration request, as determined from the accelerator pedal 20, and vehicle grade, as monitored via the grade monitoring sensor 18. The inputs from the wheel speed sensor 16, i.e., vehicle speed, and the accelerator pedal 20, i.e., operator acceleration request, are employed to determine a driver torque request (310). A calibration, such as a pedal map may be employed to generate the driver torque request. The inputs from the wheel speed sensor 16 and the grade monitoring sensor 18 are employed to determine a grade-based minimum torque (320).

Figure 4:
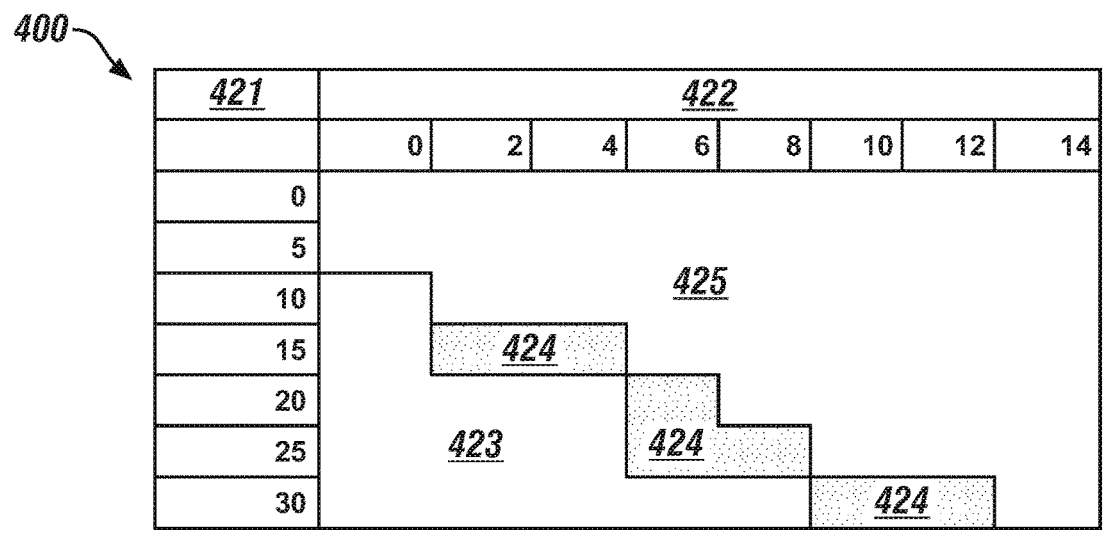
FIG. 4 graphically shows a temperature-based capability envelope that can be empirically derived for the vehicle in relation to vehicle operation on grade, in accordance with the disclosure.

FIG. 4 graphically shows a temperature-based capability envelope 400 that can be empirically derived for an embodiment of the vehicle 10 that is described with reference to FIG. 1. The temperature-based capability envelope 400 is determined by evaluating a system thermal capability in relation to vehicle grade, on the vertical axis 421 and vehicle speed, on the horizontal axis 422. A high-risk speed/grade operating region 423 indicates an area in which overheating of a critical portion of the vehicle 10, e.g., a portion of the propulsion system 30 or the electrically powered accessory device 32, is likely to occur if such operation is sustained for a short period of time. A low-risk speed/grade operating region 425 indicates an area in which overheating of a critical portion of the vehicle 10, e.g., a portion of the propulsion system 30 or the electrically powered accessory device 32, is unlikely to occur even after sustained operation. A transition speed/grade operating region 424 is also indicated. The temperature-based capability envelope 400 can be transformed into a relationship between vehicle grade and torque. In one embodiment, the grade-based minimum torque 514 is selected to exceed a target acceleration that is thermally robust, and is in the order of magnitude of 0.03 g greater than the minimum required torque 512 in one embodiment.

Figure 5:
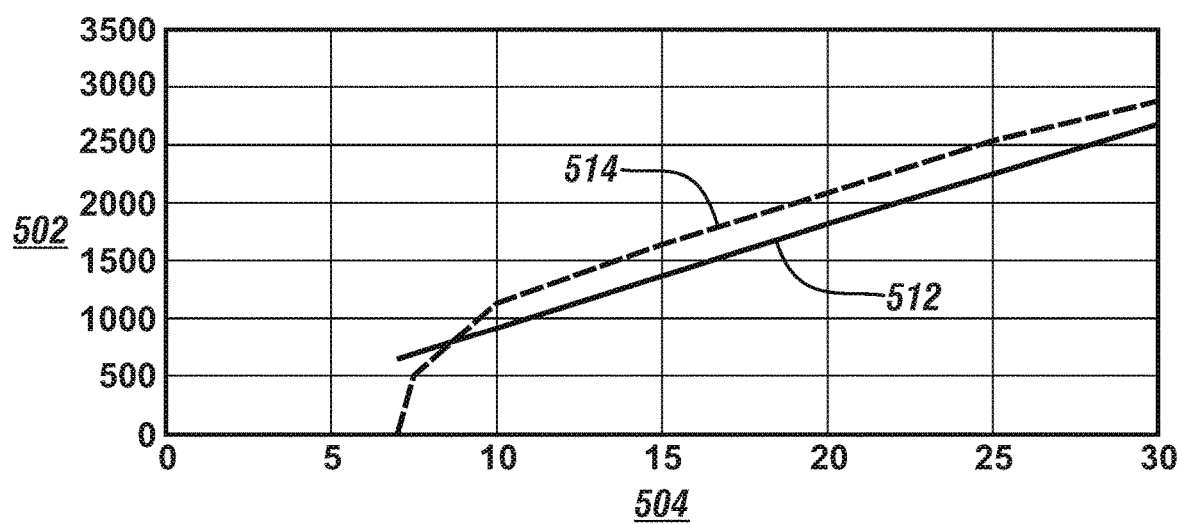
FIG. 5 graphically shows a minimum required torque to hold the vehicle on a grade at zero speed without rollback, and a grade-based minimum torque that is selected to achieve sufficient positive vehicle acceleration to avoid an excessive dwell time in the high-risk speed/grade operating region that is described with reference to FIG. 4, in accordance with the disclosure.

A minimum required torque 512 to hold the vehicle on a grade at zero speed without rollback and a grade-based minimum torque 514 are graphically shown with reference to FIG. 5, which indicates grade (%) 504 on the horizontal axis in relation to torque (Nm) 502 on the vertical axis. The grade-based minimum torque 514 is selected to achieve sufficient positive vehicle acceleration to avoid an excessive dwell time in the high-risk speed/grade operating region 423 that is described with reference to FIG. 4.

Referring again to FIG. 3, the driver torque request and the grade-based minimum torque are subjected to torque arbitration (330), which selects one of the driver torque request and the grade-based minimum torque as the axle torque request 340 for controlling operation of the propulsion system 30 and the wheel brakes 14.

Furthermore, the axle torque request 340 for controlling operation of the propulsion system 30 is replaced with either a zero torque command or the grade-based minimum torque command when the position of the accelerator pedal is less than the minimum thermally robust torque. An intermediate threshold may be included as calibratable dead pedal between a zero accelerator pedal state and the grade-based minimum torque command. The axle torque request 340 is communicated to the vehicle controller 15, which uses it to control operation of the propulsion system 30 via the powertrain controller 24 and/or the wheel brakes 14 via the braking controller 26.

Referring again to FIG. 2, when the operator acceleration request is greater than the minimum vehicle grade-based operator acceleration request, the friction brake 14 is released and the propulsion system 30 provides torque to accelerate the vehicle 10 on the grade, thus minimizing extended periods of low-speed creep operation when the vehicle is on a grade.

The concepts described herein minimize or otherwise mitigate vehicle operation that includes a hill hold operation and low-speed creep operation, which can cause problems for drive units with mechanically-driven cooling systems or launch clutches. This can discourage creep operation and engine stall on a grade using propulsion torque by adjusting the pedal map to output a minimum level of acceleration that is thermally robust. The grade-based minimum torque control described herein is advantageously enabled during high grade conditions, e.g., when the vehicle grade is greater than 10%. A desired operating area can be determined based on motor thermal behavior during uphill operation of the vehicle 10 in a low-speed operation at a creep speed. Operation at creep speed includes operation of the propulsion system 30 in response to an operator acceleration request that is zero or operator braking request that is minimal, wherein the vehicle moves at a minimal speed, such as 10 kph in one embodiment.

The friction brakes 14 can be commanded to execute a hill hold state if vehicle speed reaches zero during zero command condition in order to prevent vehicle rollback on grade.

Such operation may avoid a need for incorporating liquid-based cooling systems on motors for accessory devices, e.g., the electrically-powered accessory device 32. Such operation smoothly but quickly takes the vehicle 10 out of a band between zero speed and the creep speed when the operator request for propulsion torque is in the critical band, by acceleration or braking.

The teachings may be described herein in terms of functional and/or logical block components and/or various processing steps. It should be realized that such block components may be composed of hardware, software, and/or firmware components that have been configured to perform the specified functions. The flowcharts shown with reference to FIGS. 2 and 3 illustrate an example method of a vehicle computing system receiving instructions from one or more modules in communication with the system. The vehicle computing system communicating with the one or more modules may be implemented through a computer algorithm, machine executable code, non-transitory computer-readable medium, or software instructions programmed into a suitable programmable logic device(s) of the vehicle, such as the one or more modules, the entertainment module, a server in communication with the vehicle computing system, a mobile device communicating with the vehicle computing system and/or server, other controller in the vehicle, or a combination thereof. Although the various steps shown in the flowchart diagram appear to occur in a chronological sequence, at least some of the steps may occur in a different order, and some steps may be performed concurrently or not at all.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A vehicle system, comprising:
a propulsion system coupled to a drive wheel and a friction brake configured to apply a braking torque to the drive wheel;
an accelerator pedal configured to monitor an operator acceleration request, a brake pedal configured to monitor an operator braking request, a grade monitoring sensor configured to monitor vehicle grade, and a vehicle speed sensor; and
a controller, in communication with the accelerator pedal, the brake pedal, the grade monitoring sensor and the vehicle speed sensor, and operatively connected to the friction brake and operatively connected to the propulsion system, the controller including an instruction set, the instruction set executable to:
monitor the vehicle speed and the operator braking request, and
upon achieving a vehicle speed that is less than a threshold speed:
control, via the friction brake, the braking torque to achieve a desired vehicle speed,
determine, via the accelerator pedal, the operator acceleration request, and determine, via the grade monitoring sensor, the vehicle grade,
determine a minimum vehicle grade-based operator acceleration request, and
release the friction brake when the operator acceleration request is greater than the minimum vehicle grade-based operator acceleration request.

2. The vehicle system of claim 1, comprising the instruction set executable to control, via the friction brake, the braking torque to achieve a vehicle speed that is greater than or equal to zero speed.

3. The vehicle system of claim 1, wherein the instruction set executable to release the friction brake comprises the instruction set executable to ramp out the braking torque to achieve a zero braking torque over an elapsed time period.

4. The vehicle system of claim 3, further comprising the instruction set executable to control the propulsion system to transfer propulsion torque to the drive wheel coincident with the ramping out of the braking torque, wherein the propulsion torque is greater than the minimum vehicle grade-based operator acceleration request.

5. The vehicle system of claim 1, wherein the instruction set executable to release the friction brake comprises the instruction set executable to immediately release the braking torque to immediately achieve a zero braking torque.

6. The vehicle system of claim 5, further comprising the instruction set executable to control the propulsion system to transfer propulsion torque to the drive wheel coincident with the immediate release of the braking torque, wherein the propulsion torque is greater than the minimum vehicle grade-based operator acceleration request.

7. The vehicle system of claim 1, further comprising the instruction set executable to control the propulsion system responsive to the operator acceleration request.

8. The vehicle system of claim 1, wherein the instruction set executable to determine the minimum vehicle grade-based operator acceleration request comprises the instruction set executable to select a precalibrated value based upon heat generation and heat rejection of the propulsion system.

9. The vehicle system of claim 1, wherein the minimum vehicle grade-based output torque request is determined based upon a thermal capability of the propulsion system to handle operation for an extended period of time at a creep speed to prevent overheating of a component of the propulsion system.

10. A method for controlling a vehicle system including a propulsion system coupled to a drive wheel and a friction brake configured to apply a braking torque to the drive wheel, the method comprising:
monitoring vehicle speed and an operator braking request, and
upon achieving a vehicle speed that is less than a threshold speed:
applying, via the friction brake, the braking torque to achieve a desired vehicle speed,
determining, via an accelerator pedal, an operator acceleration request, and determine, via a grade monitoring sensor, a vehicle grade,
determining a minimum vehicle grade-based operator acceleration request, and
releasing the friction brake when the operator acceleration request is greater than the minimum vehicle grade-based operator acceleration request.

11. The method of claim 10, further comprising applying, via the friction brake, the braking torque to achieve a vehicle speed that is greater than or equal to zero speed.

12. The method of claim 10, wherein releasing the friction brake comprises executing a ramp out of the braking torque to achieve a zero braking torque over an elapsed time period.

13. The method of claim 12, further comprising controlling the propulsion system to transfer propulsion torque to the drive wheel coincident with the ramping out of the braking torque, wherein the propulsion torque is greater than the minimum vehicle grade-based operator acceleration request.

14. The method of claim 10, wherein releasing the friction brake comprises immediately releasing the braking torque to immediately achieve a zero braking torque.

15. The method of claim 14, further comprising controlling the propulsion system to transfer propulsion torque to the drive wheel coincident with the immediate release of the braking torque, wherein the propulsion torque is greater than the minimum vehicle grade-based operator acceleration request.

16. The method of claim 10, further comprising controlling the propulsion system responsive to the operator acceleration request.

17. The method of claim 10, wherein determining the minimum vehicle grade-based operator acceleration request comprises selecting a precalibrated value based upon heat generation and heat rejection of the propulsion system.

18. The method of claim 10, wherein the minimum vehicle grade-based output torque request is determined based upon a thermal capability of the propulsion system to handle operation for an extended period of time at a creep speed to prevent overheating of a component of the propulsion system.

19. A method for controlling a vehicle system including a propulsion system coupled to a drive wheel and a friction brake configured to apply a braking torque to a driven wheel, the method comprising: monitoring vehicle speed and an operator braking request, and upon achieving a vehicle speed that is less than a threshold speed: applying, via the friction brake, the braking torque to the driven wheel to achieve a zero speed, determining, via an accelerator pedal, an operator acceleration request, and determine, via a grade monitoring sensor, vehicle grade, determining a minimum vehicle grade-based operator acceleration request, and releasing the friction brake from the driven wheel only when the operator acceleration request is greater than the minimum vehicle grade-based operator acceleration request and controlling the propulsion system to generate propulsion torque at the drive wheel in response to the operator acceleration request.

* * * * *